United States Patent
Wang et al.

(10) Patent No.: US 12,551,856 B2
(45) Date of Patent: Feb. 17, 2026

(54) LITHIUM ION CONDUCTOR-POLYMER-CERAMIC MEMBRANE

(71) Applicant: MONASH UNIVERSITY, Clayton (AU)

(72) Inventors: Huanting Wang, Glen Waverley (AU); Nhi Sa Nguyen, Clayton (AU); Zhouyou Wang, Clayton (AU)

(73) Assignee: ElectraLith Pty Ltd, Clayton (AU)

( * ) Notice: Subject to any disclaimer, the term of this patent is extended or adjusted under 35 U.S.C. 154(b) by 865 days.

(21) Appl. No.: 17/634,726

(22) PCT Filed: Aug. 12, 2020

(86) PCT No.: PCT/AU2020/050839
§ 371 (c)(1),
(2) Date: Feb. 11, 2022

(87) PCT Pub. No.: WO2021/026607
PCT Pub. Date: Feb. 18, 2021

(65) Prior Publication Data
US 2022/0280901 A1    Sep. 8, 2022

(30) Foreign Application Priority Data
Aug. 12, 2019  (AU) ................ 2019902905

(51) Int. Cl.
*B01D 71/34* (2006.01)
*B01D 61/42* (2006.01)
(Continued)

(52) U.S. Cl.
CPC ......... *B01D 71/34* (2013.01); *B01D 61/422* (2013.01); *B01D 61/461* (2022.08);
(Continued)

(58) Field of Classification Search
CPC ........... B01D 2323/12; B01D 2325/14; B01D 2325/42; B01D 61/422; B01D 61/461;
(Continued)

(56) References Cited

U.S. PATENT DOCUMENTS

2012/0103826 A1    5/2012   Gordon et al.
2017/0294671 A1   10/2017   Jin et al.
(Continued)

FOREIGN PATENT DOCUMENTS

CN    101787169 A    7/2010
CN    109244546 A    1/2019
(Continued)

OTHER PUBLICATIONS

Hoshino T., "Development of technology for recovering lithium from seawater by electrodialysis using ionic liquid membrane", Fusion Engineering and Design, 88 (2013), p. 2956-2959. [4 pages].
(Continued)

Primary Examiner — Dirk R Bass
(74) Attorney, Agent, or Firm — LEASON ELLIS LLP

(57) ABSTRACT

An ion permeable membrane for selective permeation of a target ion, preferably lithium, through the membrane, the membrane comprising a target ion permeable composite comprises a target ion permeable ceramic and at least one organic polymer associated with the target ion permeable ceramic.

18 Claims, 5 Drawing Sheets

(51) Int. Cl.
  *B01D 61/46* (2006.01)
  *B01D 67/00* (2006.01)
  *B01D 71/36* (2006.01)
  *C02F 1/469* (2023.01)

(52) U.S. Cl.
  CPC ....... *B01D 67/00793* (2022.08); *B01D 71/36* (2013.01); *C02F 1/4695* (2013.01)

(58) Field of Classification Search
  CPC .............. B01D 67/00793; B01D 69/02; B01D 69/148; B01D 71/02; B01D 71/028; B01D 71/06; B01D 71/34; B01D 71/36; B01D 71/68; C02F 1/4693; C02F 1/4695
  See application file for complete search history.

(56) References Cited

U.S. PATENT DOCUMENTS

| | | | |
|---|---|---|---|
| 2019/0032230 A1 | 1/2019 | Hoshino | |
| 2019/0214622 A1* | 7/2019 | Choi | H01M 50/446 |

FOREIGN PATENT DOCUMENTS

| | | |
|---|---|---|
| KR | 20190072479 A | 6/2019 |
| WO | 2018193021 A1 | 10/2018 |
| WO | 2019/136272 A1 | 7/2019 |
| WO | 2019/189592 A1 | 10/2019 |
| WO | 2020/049884 A1 | 3/2020 |

OTHER PUBLICATIONS

Hoshino T., "Preliminary studies of lithium recovery technology from seawater by electrodialysis using ionic liquid membrane", Desalination 317 (2013), p. 11-16. [6 pages].

Hoshino T., "Innovative lithium recovery technique from seawater by using world-first dialysis with a lithium ionic superconductor", Desalination 359 (2015), p. 59-63. [5 pages].

Kunshina et al. "Sol—Gel Synthesis of $Li_{1.3}Al_{0.3}Ti_{1.7}(PO_4)_3$ Solid Electrolyte", Russian Journal of Inorganic Chemistry 59(5): 424-430 (2014). [7 pages].

Liu et al. "Lithium extraction from seawater by manganese oxide ion sieve $MnO_2 \cdot 0.5H_2O$", Colloids and Surfaces A: Physicochemical and Engineering Aspects, 468 (2015), p. 280-284. [5 pages].

Sun et al. "Separation of magnesium and lithium from brine using a Desal nanofiltration membrane", Journal of Water Process Engineering, 7 (2015), p. 210-217. [8 pages].

Wen et al. "Preliminary study on recovering lithium chloride from lithium-containing waters by nanofiltration", Sep. Purif. Technol., 49 (2006), p. 230-236. [7 pages].

Yang et al. "Investigation of $Mg^{2+}/Li+$ Separation by Nanofiltration", Chinese Journal of Chemical Engineering, 19(4), p. 586-591, (2011). [6 pages].

Supplementary European Search Report in EP Application No. EP 20853414 dated Jul. 14, 2023.

Lancel et al., "Hybrid Li Ion Conducting Membrane as Protection for the Li Anode in an Aqueous Li-Air Battery: Coupling Sol-Gel Chemistry and Electrospinning", Langmuir, 2017, 33, pp. 9288-9297.

Xia et al., "A Newly Designed Composite Gel Polymer Electrolyte Based on Poly (Vinylidene Fluoride-Hexafluoropropylene) (PVDF-HFP) for Enchanced Solid-State Lithium-Sulfur Batteries", Chemistry—A European Journal, 2017, 23, pp. 15203-15209.

Shi et al., "Fabrication and electrochemical properties of LATP/PVDF composite electrolytes for rechargeable lithium-ion battery", Solid State Ionics, 2018, 325, pp. 112-119.

Shi Xiaojuan; Ma Nengyan; Wu Yixue; Lu Youhua; Xiao Qizhen; Li Zhaohui; Lei Gangtie; "Fabrication and electrochemical properties of LATP/PVDF composite electrolytes for re chargeable lithium-ion battery"; Solid State Ionics, (Nov. 1, 2018), vol. 325, pp. 112-119.

Wonsung Choi, Mokwon Kim, Jung Ock Park, Joon-Hee Kim, Kyunghwan Choi, Yong Su Kim, Tae Young Kim, Ken Ogata, Dongmin Im, Seok-Gwang Doo & Yunil Hwang; Scientific Reports (Nature), (Sep. 20, 2017), 7: 12037; pp. 1-9.

Lancel, Gilles; StevEns, Philippe; Toussaint, Gwenaelle; Marechal, Manuel; Krins, Natacha; Bregiroux, Damien; Laberty-Robert, Christel; "Hibrid Li Ion Conducting Membrane as Protection for the Li Anode in an Aqueous Li-Air Battery: Coupling Sol-Gel Chemistry and Electrospinning" ; Langmuir (2017), 33(37), 9288-9297.

International Search Report and Written Opinion of corresponding application PCT/AU2020/050839, mailed on Sep. 30, 2020.

* cited by examiner

LITHIUM ION CONDUCTOR-POLYMER-CERAMIC MEMBRANE

FIELD OF THE INVENTION

The present invention relates to a lithium ion recovery and a membrane and device for selective lithium ion recovery from a liquid solution, particularly an aqueous solution such as brine.

BACKGROUND

Globally the demand for lithium is growing. Lithium salts are primarily extracted from both mineral deposits and salt lakes. The processes used to produce Li and its compounds involve acid digestion and chemical leaching of minerals or concentration of brines using solar ponds, and subsequent lithium separation using carbonate precipitation. However, these processes are complex, time consuming or in high demand for chemicals or local climate. For instance, pre-concentration of brines using solar energy or wind takes a period of 4 to 5 months or even longer. Moreover, these traditional methods have suffered from many known issues, such as complexities in the design process, low Li recovery, or impurity content control. Brine is one of the most important sources of lithium. Recovering lithium from brine typically involves at least one of an adsorption process, precipitation process, ion exchange and solvent extraction process. However, separation of lithium and magnesium is difficult due to their chemical similarities such that the purity of lithium product recovered from brine is relatively low.

Lithium can also be recycled from used lithium batteries and various types of lithium containing wastes. At present, no lithium extraction is industrially practiced from used lithium battery.

Membrane based $Li^+$ recovery processes have been studied, with only limited published reports discussing techniques such as nanofiltration, electrolysis, electrodialysis, dialysis, membrane solvent extraction and membrane type adsorbents or mixed matrix membranes. For example, the nanofiltration of brine using a spiral-wound Desal-5 DL 2540C membrane (GE Osmonics), resulted in a $Li^+/Mg^{2+}$ separation factor of 3.5 (X. Wen et al., Sep. Purif. Technol., 49 (2006), p: 230-236). A Desal-DK membrane (GE Osmonics) showed a $Li^+/Mg^{2+}$ separation factor ranging between 2 to 3.2 depending upon the feed $Li^+$ and $Mg^{2+}$ concentration and their ratio (Y. Gang, et al., Chinese Journal of Chemical Engineering, 19 (2011), p: 586-591; S.-Y. Sun et al., Journal of Water Process Engineering, 7 (2015), p: 210-217).

Liu et al. (Colloids and Surfaces A: Physicochemical and Engineering Aspects, 468 (2015), p: 280-284) studied the effect of different parameters on the $Li^+$ extraction performance from brine via electrodialysis testing. At optimized operating conditions, the electrodes exhibited a noteworthy $Li^+$ exchange capacity of 38.9 mg/g.

Hoshino (Fusion Engineering and Design, 88 (2013), p: 2956-2959; Desalination 317 (2013), p: 11-16) reported the use of an ionic liquid (N-methyl-N-propylpiperidium bis (trifluoromethanesulfonyl)imide) through which only major seawater ions, including Na, Mg, Ca, and K but not Li, permeate from anode to cathode during the electrodialysis. $Li^+$ can be concentrated on the anode and recovered by chemical precipitation with the addition of magnesium. However, the monovalent ions (Na, K, and Li) could not be separated.

In another study, Hoshino (Desalination 359 (2015), p: 59-63) employed electrodialysis to extract lithium from seawater by means of a Li ionic superconductor at an applied voltage of 2V. It showed good lithium selectivity compared to (Na, Mg, Ca and K). Here, the driving force of extracting $Li^+$ from seawater into a recovery solution was due to an electrical potential. The practical ratio of lithium recovery was found to reach 7% after 72 h.

However, the existing lithium selective membranes show relatively low lithium selectivity, poor stability and restricted practical application.

It is an object of the invention to address at least one short coming of the prior art and/or to provide an alternative membrane to that of the prior art.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

STATEMENTS OF THE INVENTION

In a first aspect of the invention, there is provided a separation membrane comprising:
  a target ion permeable polymer-ceramic composite material comprising:
  a target ion permeable ceramic and at least one target ion permeable organic polymer associated with the target ion permeable ceramic,
  wherein the membrane allows selective permeation of a target ion through the membrane.

Desirably, the membrane is a target ion separation membrane. More desirably, the membrane is for target ion separation from an aqueous solution. Preferably, the solution comprises the target ion and at least one other ion.

In a second aspect of the invention, there is provided a membrane for lithium target ion separation from an aqueous solution of ions, the membrane comprising:
  a lithium target ion porous support substrate supporting a lithium target ion permeable polymer-ceramic composite material;
  wherein the target ion permeable polymer-ceramic composite material is $Li_{1.3}Al_{0.3}Ti_{1.7}(PO_4)_3$ (LATP) ceramic associated with polyvinylidene fluoride (PVDF), wherein the PVDF is present in the target ion permeable polymer-ceramic composite at a concentration (wt %) ratio of about 10:1 (ceramic:polymer).

Preferably, the aqueous solution comprises the target ion and at least one other ion.

In a third aspect of the invention, there is provided a process for manufacturing a membrane, preferably an electrodialysis membrane, comprising the steps of:
  preparing a solution of a target ion permeable ceramic material, preferably LATP, and at least one organic polymer, preferably PVDF, in a volatile organic solvent, preferably dimethylforamide (DMF);
  solution casting the solution onto a mould of a predetermined shape;
  evaporating the solvent to form a membrane of a target ion permeable polymer-ceramic composite material.

In a fourth aspect of the invention, there is provided a membrane obtainable by the third aspect.

In a fifth aspect of the invention, there is provided a use of a membrane of the first or the fourth aspects in a target ion separation technique, preferably a lithium ion separation technique, most preferably electrodialysis.

In a sixth aspect of the invention, there is provided an electrodialysis method of selective lithium ion separation from brine or lithium ion separation from lithium containing solution from a lithium recycling method, comprising the step of applying a voltage to a membrane of the first or the fourth aspects In a seventh aspect of the invention, there is provided an electrodialysis stack comprising a membrane the first or the fourth aspects disposed between a pair of anion exchange membranes.

DETAILED DESCRIPTION OF THE INVENTION

Figure 1:
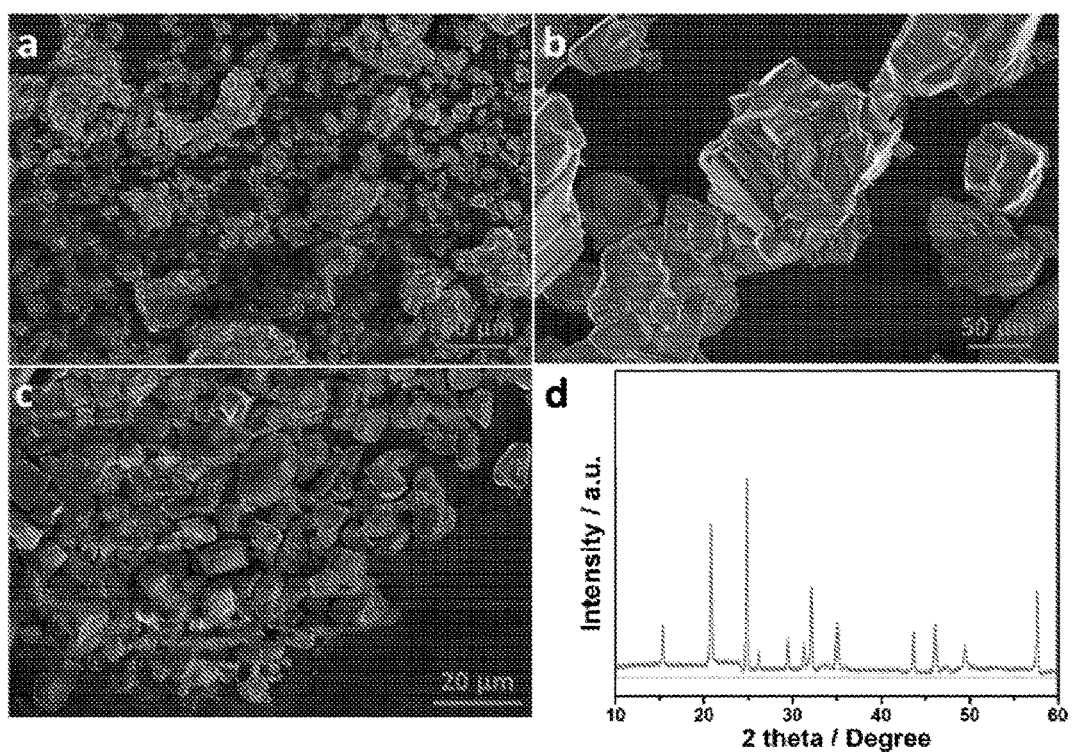
FIG. 1 shows SEM images before (a,b) and after (c) ball milling of LATP and XRD pattern (d)

The invention provides a membrane for target ion separation from an aqueous solution of ions, for example, a brine solution, or a solution comprising lithium ions arising from a lithium ion or lithium battery recycling process. The membrane comprising a target ion permeable ceramic and at least one target ion permeable organic polymer associated with the target ion permeable ceramic, wherein the membrane allows for selective permeation of a target ion through the membrane. The membrane of the invention comprises a target ion permeable polymer-ceramic composite material which ionically conducts the target ion of interest. Preferably, the membrane supports selective permeation of a desired alkali metal ion through the membrane. Desirably, the target ion is lithium ion.

Suitably, the at least one organic polymer may be in the form of a polymer matrix in which the ceramic particles are embedded or encapsulated. Suitably, the at least one organic polymer coats or encapsulates at least a portion of the particles of the target ion permeable ceramic. Desirably, the at least one organic polymer coats or encapsulates all of the particles of the target ion permeable ceramic. Suitably, the target ion permeable ceramic particles are embedded in a matrix of the one or more organic polymers. Preferably, the at least one organic polymer is selectively permeable to the target ion. Preferably, the at least one organic polymer has a porous structure. Suitably, the pores of the organic polymer exclude ions which are not target ions, e.g., non-lithium ions.

Suitably, the ion permeable ceramic may comprise solid particles, which include grains, granules, crystals, crystallites and particle aggregates of grains, granules, crystals, and crystallites.

Preferably the ceramic particles have a particular average particle size distribution. For example, the ceramic particles may have a particle size distribution ranging from 200 nm to 50 μm. The particle aggregates of particles, granules, crystals, and crystallites may have a particle size distribution ranging from about 0.05 μm to about 50 μm average diameter, preferably from about 0.1 μm to about 30 μm average diameter, more preferably from about 0.2 μm to about 10 μm average diameter. The particle aggregates may arise from sintering or compaction of the one or more of the particles, granules, crystals, and crystallites. Individual particles, granules, crystals, or crystallites may have a particle size distribution ranging from 200 nm to about 300 nm diameter. The crystals and crystallite may be polycrystalline or single crystals. Suitably, the crystals or crystallites comprise one or more grains. The grains may be associated with grain boundaries which are surface defects or area defects forming interfaces between grains of different orientation in a particle. The grains and crystallites may vary in size and orientation within the ceramic material. As used herein, "the term particles" is intended to cover particles, granules, crystals, and crystallites and particle aggregates. A preferred average particle size distribution may arise from comminution of the ceramic material, for example, by ball milling. Suitably, prior to ball milling, a preferred target ion permeable ceramic average particle size may be above 100 μm. Desirably, the ceramic starting material may be comminuted, for example, balled milled, to give a ceramic powder having desired particle size range distribution. In one embodiment, the particles and particle aggregates may be substantially regular, irregular or mixtures of regular or irregular shapes, for example, substantially cuboid, rectanguloid, hexagonal, pyramidal, diamond, spherical or ellipsoidal in shape. In some embodiments, the shape is not fibre or rod like.

Preferably, the target ion permeable polymer-ceramic composite material of the membrane is one or more of sintered and/or compacted. A preferred membrane comprises target ion permeable polymer-ceramic composite material provided in the form of a plate-link sintered compact. In some embodiments, the plate-like sintered compact material comprises material in which particles of the target ion permeable ceramic take the form of an interlocked structure of sintered, compacted and/or densified particles of the ceramic. In some embodiments, some of the ceramic particles are fused together to form agglomerated particles of ceramic. Densification occurs where the porosity of the material is reduced thereby making the material denser. Density can be reduced by higher packing of particles in a given area or volume which can be achieved by reducing particle size. The density is a measure of the average number of particles in a particular unit volume or unit area of the membrane. In denser parts of the membrane there are fewer gaps between the ceramic particles whereas in less dense parts of the ceramic there are more gaps between the particles. In denser parts of the membrane, unit areas or unit volumes of those areas have higher average numbers of particles than less dense parts of the membrane which have lower average numbers of particles than the denser parts. It will be understood that area holding smaller particles will be more dense (denser) in terms of higher average particle numbers than equivalent areas/volumes holding larger particles will be less dense in terms of holding lower average particle numbers.

In other embodiments, grains boundaries between the particles are formed on sintering and/or compaction. Desirably, the at least one organic polymer may fill gaps between grain boundaries in the ceramic particles. The organic polymer may fill substantially all the gaps between the grain boundaries or at least a portion of the gaps between the grain boundaries. Advantageously, the inclusion of a second organic polymer may further fill gaps between the ceramic and the at least one organic polymer.

Desirably, the target ion permeable ceramic and the at least one organic polymer may be present in the target ion permeable polymer-ceramic composite at a concentration (wt %) ratio of from about 1:1 to about 20:1, more preferably about 1:1 to about 15:1, most preferably about 10:1 (ceramic:polymer). In some embodiments, the ceramic and the at least one organic polymer are present in the composite at a concentration (wt %) ratio of from about 1:1 to about 18:1, preferably, from about 5:1 to about 15:1, more preferably still from about 8:1 to about 12:1, most preferably about 10:1.

Described herein is a membrane of a target ion permeable polymer-ceramic composite material for selective permeation of a target ion through the membrane, preferably lithium target ion, the membrane comprising: a target ion permeable ceramic and at least one organic polymer associated with the target ion permeable ceramic. Desirably, the membrane is selectively permeable to the target ion, preferably when the membrane is under the influence of an electrical potential. Suitably, the membrane may be subjected to an electrical potential.

Suitably, in the membrane of the invention, the target ion permeable ceramic particles in the target ion permeable polymer-ceramic composite material are sintered. Desirably, the membrane does not comprise a homogenous dispersion of ceramic particles in the polymer matrix. Preferably, the membrane comprises a heterogenous dispersion of ceramic particles in the polymer matrix.

Desirably, the target ion permeable ceramic particles are compacted in the membrane. Suitably, the compaction of the ceramic particles throughout the polymer matrix is not homogeneous. Suitably, the ceramic particle compaction is heterogeneous throughout the polymer matrix.

Preferably, the level of compaction is variable across a vertical cross section of the membrane. This means the target ion permeable ceramic compaction level may vary across a vertical cross section of the membrane. In some embodiments, the level of target ion permeable compaction decreases across a vertical cross section of the membrane in the form of a decreasing particle compaction gradient. In some embodiments, the level of target ion permeable ceramic density decreases going across a vertical cross section of the membrane in the form of a decreasing particle density gradient. In some embodiments, the level of target ion permeable ceramic particular size decreases going across a vertical cross section of the membrane in the form of a decreasing particle size gradient.

Desirably, the target ion permeable polymer-ceramic composite may comprise at least two regions, wherein a first region comprises a target ion permeable ceramic rich region comprises densely packed particles of target ion permeable ceramic, and a second region comprising less densely packed particles of target ion permeable ceramic than the first region. In some embodiments, a preferred membrane may comprise at least one subsequent region which comprises less densely packed particles of target ion permeable ceramic than an immediately preceding region.

In some embodiments, the target ion permeable polymer-ceramic composite may comprise at least two layers wherein a first layer comprises a target ion permeable ceramic rich layer comprising particles of target ion permeable ceramic, and a second layer which is an organic polymer rich layer, wherein the first layer comprises more target ion permeable ceramic particles than the organic polymer rich layer.

Preferably, during fabrication, a solvent suspension of the target ion permeable ceramic composite and the at least one organic polymer is cast into a vessel having a desired membrane shape. Evaporation of the solvent from the solution leads to formation of the membrane having a desirable microstructure as described above. Where the ceramic material comprises a particle size distribution of larger and small ceramic particles, during the solvent evaporation process, the larger ceramic particles preferentially move to the bottom regions of the cast suspension, while the smaller particles remain suspended in the upper region of the cast suspension. As the solvent evaporates, the particles compact together and are embedded in a matrix of the polymer which is formed during evaporation. In the bottom regions of the membrane, settling and compaction of the larger particles leaves relatively large gaps and spaces (porosity) between the particles which are filled by the polymer matrix, making the bottom regions of the membrane porous. By contrast, compaction of the smaller particles at the upper region of the membrane results in a denser region of ceramic particles which has much smaller gaps and spaces between the ceramic particles. As the upper regions have smaller gaps and spaces, less polymer is required to fill these gaps and spaces. This leads to a membrane having regions of different particle densities, and different densities of polymer. In some embodiments, the resultant microstructure may take the form of a particle size gradient across a vertical cross section of the membrane. Larger, less densely packed ceramic particles are found at the bottom regions of the membrane, while smaller, more densely packed ceramic particles are found at the upper regions of the membrane. An organic polymer matrix may be found in all membrane regions but in varying amounts which are proportional to the size of the gaps and spaces between the ceramic particles. Thus, a preferred membrane comprises ceramic particle rich regions and polymer rich regions. In some embodiments, intermediate regions of the membrane comprise ceramic particles of immediate particle sizes with correspondingly intermediately sized gaps and spaces between the particles.

In one embodiment, the ion permeable ceramic may be formed by a solid-state reaction including co-precipitation, sol-gel, or a melting-quenching method, preferably a sol-gel method. Preferably, the ceramic is substantially pure with no impure phases identifiable using techniques such as scanning electron micrograph (SEM) images and/or X-ray diffraction (XRD) analysis. Desirably, the target ion permeable ceramic may be a lithium super ionic conductor having lithium-ion channels and including LISICON-type, argyrodites, LGPS and LMPS compounds. Preferably, the ceramic material is selected from a NASICON or LISICON material, preferably LATP ($Li_{1+x}Al_xT_{1-x}(PO_4)_3$, x=0.3-0.4), most preferably $Li_{1.3}Al_{0.3}Ti_{1.7}(PO_4)_3$ which has excellent water stability and lithium-ion conductivity. In one embodiment, the target ion permeable ceramic is a LATP ceramic, preferably having a crystal phase and morphology as shown by the respective XRD pattern and SEM images in FIG. 1. Desirably, the LATP ceramic is crystalline, for example, having a rhombohedral lattice, for example, as confirmed by X-ray diffraction. Preferred LATP ceramic does not include impurities, particularly $AlPO_4$ impurity.

Suitably, the ion permeable ceramic comprises a plurality of ion transport channels that selectively allow ion movement, transport or passage through the ceramic material. Desirably, the ion channels are metal ion channels. Ion movement, transport or passage is considered to occur from one side of the composite to another, e.g., opposing sides of the composite. Opposing sides of the composite corresponding to opposing faces when the composite is membrane shaped.

Preferably, interfaces of the target ion permeable ceramic and the at least one organic polymer, the organic polymer and the target ion permeable ceramic are intertwined and/or interwelded together. Advantageously, this may result in a particularly robust physical adhesion between the organic polymer and the target ion permeable ceramic. In some embodiments, the polymer may ingress into at least a portion of the target ion transport channels in the ceramic.

Preferably, the target ion permeable polymer-ceramic composite comprises at least two layers wherein a first layer comprises a target ion permeable ceramic rich layer comprising particles of target ion permeable ceramic, and a second layer which is an organic polymer rich layer, wherein the first layer comprises more target ion permeable ceramic particles than the organic polymer rich layer. It will be understood that the target ion permeable ceramic rich layer comprises more particle of ceramic based material than the organic polymer rich layer. Preferably, the second layer may form an outer coat on an inner body comprising the first layer of target ion permeable ceramic.

Further, the ion permeable polymer-ceramic composite may comprise three layers, whereby the ceramic based material forms a ceramic interlayer which is bound on opposing faces by at least one organic polymer layer. In another embodiment, the interlayer arrangement can be bound by a further layer of a different organic polymer to form a more complex ion permeable polymer-ceramic composite structure. In one particular embodiment, the at least one organic polymer coats opposing surfaces of the target ion permeable ceramic. The polymer coat may be the same or different on the opposing surfaces.

In some embodiments, the target ion permeable ceramic particles are associated with the at least one organic polymer in one or more of the herein described ways.

In some embodiments, the ceramic and a first organic polymer associated with the ceramic in the form of a coating of particles and/or a coating of the layer of ceramic material. Suitably, the at least one organic polymer may coat at least a portion of the particles (and particle aggregates) of the target ion permeable ceramic. In other words, in some embodiments, some but not all (minority) of the particles of the ceramic may be coated with the organic polymer. In some embodiments, more (majority) of the particles of the target ion permeable ceramic than not are coated with the organic polymer. In other embodiments, most of the individual particles of the ceramic are uncoated. In other embodiments, the at least one organic polymer coats substantially all of the particles of the target ion permeable ceramic.

If desired, the coating may comprise two or more organic polymers, for example, in the form of a single co-polymer coating, or in the form of distinct coatings of individual polymers, or distinct coatings of co-polymers or combinations thereof. In some embodiments, the organic polymer associated with the target ion permeable ceramic to form the target ion permeable polymer-ceramic composite of the membrane comprises a combination of two or more individual layers of organic polymers. The individual polymer coatings can be the same polymer or a different polymer.

Suitably, the at least one organic polymer is a hydrophilic polymer or a combination or blend of two or more organic polymers. The organic polymer may be selected from the group consisting of: polyvinylidene fluoride (PVDF), a sulfonated tetrafluoroethylene-based fluoropolymer-copolymer (e.g., Nafion), chitosan, a polysulfone, and combinations thereof. Most preferably, the organic polymer is PVDF. PVDF is a commercially available membrane material with excellent thermal stability, mechanical strength and chemical resistance. High molecule weight PVDF having a molecular weight of from 200 kDa to 600 kDa is preferred. PVDF having a molecular weight of from 450 kDa to 575 kDa is more preferred. In one embodiment, PVDF having a molecular weight of 534 k is particularly preferred.

In some embodiments, a blend or two or more organic polymers can be used, preferably PVDF and Nafion. Where PVDF and Nafion are included, suitably, the Nafion may be provided in the form of an overcoat on the PVDF coating. The second polymer can be provided as a second coating over the first coating of organic polymer, or as an additive. In one embodiment, including a second organic polymer increases $Li^+/K^+$ selectivity. In one embodiment, Nafion has been found to be an excellent second organic polymer. For instance, in one embodiment a 1 micron thin Nafion layer was coated over the first coating of organic polymer increases $Li^+/Na^+$ selectivity from 9.64 to 13.33.

Preferably, the lithium ion permeable ceramic is LATP and the organic polymer is PVDF or a combination of PVDF and Nafion.

Particles, that is, individual particles, agglomerations of grains, granules and/or particles of the target ion permeable ceramic may be substantially or fully wrapped or coated, or partially wrapped or coated by the at least one organic polymer. The wrap or coating may result from one or more layers or coats of polymer or co-polymer, for example, a first or second layer of the same or different organic polymers. Suitably, the effect may be to embed the ceramic particles in a polymer matrix.

In some embodiment, the particles of the target ion permeable ceramic may form a first layer of a ceramic based material. The ceramic based material may itself be coated with a further layer of one or more organic polymers. In another embodiment, the ceramic based material is disposed between layers of the organic polymer, for example, the ceramic based material is sandwiched between one or more layers of organic polymer layers providing an interlayer of ceramic based material. For example, the ceramic based material is sandwiched between layers of PVDF, which may also then be further sandwiched by Nafion.

Preferably, the target ion permeable polymer-ceramic composite is provided in a planar shape or in the form of plate. It will be understood that a planar shape means the membrane has dimensions which are substantially larger in two directions that in one direction. In other words, the membrane is substantially 2D shaped as opposed to 3D shaped. The membrane may be a plate-like shape, preferably a disc-shaped plate-like shape, square-shaped plate-like shape, or rectangular-shaped plate-like shape. Suitably shapes include plate shaped or disc shaped configurations, but it may also be provided in the form of a rollable sheet of membrane material. Suitably, the ion permeable ceramic is provided on a substrate in the form of a plate-like sintered compact.

Suitably, the ion permeable membrane is selectively permeable to one or more target ions to the exclusion of other non-desirable ions. Preferably, the target ion is a metal ion. Suitably, the metal ions are monovalent cations, preferably alkali ions, most preferably sodium ions or lithium ions, particularly lithium ions. Other alkali ions include potassium, rubidium, and caesium. In one embodiment, the ion permeable membrane is not permeable to non-lithium monovalent ions including $K^+$, $Na^+$, etc. In one embodiment, the ion permeable membrane is not permeable to divalent and trivalent metal ions such as $Mg^{2+}$. Selectivity for lithium ions is particularly preferred. Suitably, the selectivity is for bare ions, that is, metal ions which are not hydrated ion species, e.g., lithium ions as opposed to hydrated lithium ions.

Desirably, the organic polymer is permeable to target metal ions, preferably lithium ions, more preferably, selectively permeable to target metal ions, preferably lithium ions. More desirably, the organic polymer is permeable to target metal ions, preferably lithium ions, under the influence of an electrical potential.

Preferably, the lithium ion permeable ceramic has a lithium ion conductivity greater than $1\times10^{-4}$, more preferably, greater than $1\times10^{-3}$ S cm$^{-1}$ at 25° C. Preferably, the lithium ion permeable composite has a lithium ion conductivity greater than $1\times10^{-4}$, more preferably, greater than $1\times10^{-3}$ S cm$^{-1}$ at 25° C. Preferably, the target ion permeable ceramic is a lithium super ionic conductor material.

The membrane is useful for lithium ion recovery from a liquid solution, particularly an aqueous solution such as brine. The membrane is capable of extracting lithium from solutions which are concentrated in lithium up to a concentration level equaling the solubility of a particular lithium salt of interest. Lithium recovery from high concentration lithium solution is easier in terms of economic viability. However, in principle, substantially all lithium ions can be recovered for any desired solution, even at the ppm level e.g. around 1 ppm. In particular, in the experiments described herein, the present inventors have shown effective recovery from a solution having a concentration of 300 ppm and 1000 ppm.

In one preferred embodiment, the invention provides a membrane for lithium target ion separation from an aqueous solution of ions. Such a membrane may comprise a lithium target ion porous support substrate supporting a lithium target ion permeable polymer-ceramic composite material. The target ion permeable polymer-ceramic composite material may be $Li_{1.3}Al_{0.3}Ti_{1.7}(PO_4)_3$ (LATP) ceramic associated with polyvinylidene fluoride (PVDF). Desirably, the PVDF may be present in the target ion permeable polymer-ceramic composite at a concentration (wt %) ratio of about 10:1 (ceramic:polymer).

Also described is a membrane comprising: a target ion porous support substrate; a target ion permeable polymer-ceramic composite material supported on the porous support substrate, wherein the target ion permeable polymer-ceramic composite material comprises a target ion permeable ceramic and at least one organic polymer associated with the target ion permeable ceramic, and wherein the membrane is for selective permeation of a target ion through the membrane, preferably lithium target ion.

Also described is a lithium ion permeable membrane for selective permeation of lithium target ion, the membrane comprising: a lithium target ion porous support substrate; a lithium target ion permeable polymer-ceramic composite material supported on the porous support substrate; wherein the target ion permeable polymer-ceramic composite material comprises LATP ceramic, and at least one organic polymer including PVDF associated with the target ion permeable ceramic, wherein the at least one organic polymer is present in the target ion permeable polymer-ceramic composite at a concentration (wt %) ratio of about 10:1 (ceramic:polymer).

Suitably, the ion permeable membrane is supported on target ion porous support substrate.

While the target ion permeable polymer-ceramic composite described above in the first aspect can be used as a standalone membrane, supporting the target ion permeable polymer-ceramic composite material on a target ion porous support substrate in some embodiments is advantageous in that it allows a thinner layer of target ion permeable polymer-ceramic composite material to be used in relevant separation applications.

Preferably, the substrate support has an average thickness less than the thickness of the target ion permeable polymer-ceramic composite.

Desirably, the target ion porous substrate support may be a woven or non-woven synthetic fabric. The fabric may be formed from one or more of: polyethylene, polypropylene, polyacrylonitrile, polyvinyl chloride, polyester, polyamide, and copolymers thereof, or porous membranes based on e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl-1-pentene), polyvinylidene fluoride, polytetrafluoroethylene, polyhexafluoropropylene, polychlorotrifluoroethylene, and copolymers thereof. In a preferred embodiment, the substrate support comprises porous nylon or porous alumina.

The membrane is the invention may be used in a separation technique, preferably, dialysis or electrodialysis.

The membrane may be used in a separation technique, preferably, dialysis or electrodialysis, most preferably in a lithium ion dialysis or electrodialysis separation technique. Suitably, the lithium ion separation technique involves lithium ion separation from an aqueous salt solution, for example, brine, seawater or an aqueous solution from a lithium ion recycling or recovery process.

An electrodialysis method of selective lithium ion separation from an aqueous salt solution, preferably, brine or seawater or an aqueous solution from a lithium ion recycling or recovery process, comprises the step of applying a voltage to a provides a membrane according to the first or second aspects. An electrodialysis stack may comprise one or more membranes as described herein. In an electrodialysis stack, each membrane may be disposed between a pair of anion exchange membranes. Desirably, a preferred electrodialysis stack comprises a plurality of membranes, each membrane disposed between a pair of anion exchange membranes.

The invention also relates to a process for manufacturing a membrane as described, preferably a membrane for electrodialysis. Such a method may comprise preparing a solution of a target ion permeable ceramic material, preferably LATP, and at least one organic polymer, preferably PVDF. Preferably, the solution is prepared in an organic solvent, preferably a volatile organic solvent, such as dimethylformamide (DMF). The resultant solution can be stirred until a suspension is formed, for example, for 24 hours. The membrane may then be formed by solution casting the solution onto a mould of a predetermined shape, for example, a plate shape. Suitable molds include glass containers. The solvent may then be evaporated to form a membrane of a target ion permeable polymer-ceramic composite material. Preferably, the step of evaporating the solvent involves evaporation via a solvent evaporation-induced phase separation (SEIPS) process. Depending of the size of the desired membrane, the evaporation step may take up to 24 hours. Evaporation can be temperature assisted, for example, good results have been achieved evaporating the solvent at around 60° C.

In one embodiment, a preferred membrane may be produced from a solvent evaporation-induced phase separation (SEIPS) process. In this embodiment, the ceramic particles are embedded in the one or more polymer materials. The one or more polymers are in the form of a matrix around the ceramic particles. The density of the ceramic particles and the polymer in the composite exhibits regional variation. In other words, the ceramic particles are not homogenously dispersed though the polymer matrix. The membrane does not have a single ceramic density or polymer density. Rather, the dispersion of particles and polymer is heterogenous giving a particular microstructure involving variable particle density and variable polymer density at different horizontal regions of the membrane. In some embodiments, a preferred microstructure involves a membrane having dense upper layers or regions having reduced porosity, and less dense bottom layers or regions having increased porosity. The bottom layers or regions corresponds to parts of the membrane that is closest to the mold during fabrication. Cross-sectional SEM imaging of such membranes may be associated with a particular microstructure arising from the arrangement of ceramic particles and how they are embedded within the matrix of the polymer. For example, smaller ceramic particles may be located in the upper regions of the membrane (closer to the skin layer) while larger ceramic particles may be located in the bottom regions of the membrane. In some embodiments, intermediate sized particles may be located in intermediate regions of the membrane. These layers or regions are with reference to vertical cross-sectional regions through the upper and bottom faces of the membrane.

Desirably, a preferred microstructure is one in which a ceramic particle size gradient runs across a vertical cross section of the membrane. Desirably, a preferred microstructure has a ceramic particle density gradient runs across a vertical cross section of the membrane. A preferred microstructure has a polymer density which is inversely proportional to the ceramic particle density or ceramic particle size gradient at a particular horizontal region of the membrane. Preferably, smaller, more compacted ceramic particles are located in the particle denser upper layers or regions of the membrane. Suitably, larger, less compacted ceramic particles are located in the less particle dense bottom layers or regions of the membrane. Conversely, the upper layers or regions of the membrane comprise a lesser proportion of polymer than the less particle dense bottom layers or regions of the membrane which comprises a greater proportion of polymer. In some embodiments, this microstructure may be associated with high target ion flux through the membrane.

One way of forming membranes having a preferred microstructure involves rapid sedimentation of the larger agglomerates of ceramic particles during a solvent evaporation-induced phase separation (SEIPS) process. During SEIPS, as solvent evaporates beyond the solubility limit of the polymer, the polymer continues to absorb water vapour from the atmosphere (preferably with humidity of 40-60%), the polymer undergoes a phase separation, slowly forming a solid-phase polymer dense film around the ceramic sediments. The interparticle space between ceramic particles filled with polymer became narrower as polymer gradually changes phase from a fluid to a glassy region. Completion of SEIPS leads to a ceramic-polymer membrane with a dense upper layer or region and a ceramic-polymer mixed matrix.

In some embodiments, the variable compaction or the gradient structure may assist in achieving a high-performance membrane as the ion permeance may be influenced by the thickness of the membrane. An asymmetric microstructure/gradient structure described, such as the cross-section shown in FIG. 6f, may enable faster ion transport as the top/upper layer(s) or region(s) act as a selective barrier while the bottom layer(s) or region(s) provide mechanical strength and rigidity to the membrane.

The overall ion conductivity of the membrane in such embodiments is based on the regional conductivity across the membrane cross-section between the skin layer and the bottom layer. For example, the PVDF chains have very low conductivity (in the order of $10^{-12}$ S/cm) and serve to provide excellent mechanical properties and chemical resistance to the membrane. On the other hand, the total conductivity of LATP particles is the result of the grain conductivity and grain boundary resistance, where conductivity across the grain boundary is several orders of magnitude lower. One ideal structure of the membrane may comprise a dense selective barrier that provides the membranes with the high lithium selectivity and a membrane cross-section that also enables fast ion transport across the membrane. It is believed that ion transport is likely to be governed by both the top/upper layer(s) or regions and the more porous bottom support layer(s) or regions.

DESCRIPTION OF AN EMBODIMENT OF THE INVENTION

The inventors have fabricated an asymmetric lithium-selective mixed-matrix membrane based on NASICON-type LATP superionic conductor and PVDF. Using the LATP-PVDF membrane, the inventors have demonstrated the low energy recovery of lithium from different sources, including seawater, where the lithium ion is in the range of 100-200 ppb.

Example 1—A polymer-based membrane for lithium extraction has been developed, particularly for lithium extraction by an electrodialysis process. Polymer-based membranes show numerous advantages, including high acid resistance, low cost, high long-term stability and ease of scaling up. Described herein is a polymer-based lithium extraction membrane, which showed excellent single Li ion selectivity and high Li ion permeation. The selectivity remained stable after 15 days. The method reported in this work can be easily scaled up.

Membrane preparation —$Li_{1.3}Al_{0.3}Ti_{1.7}(PO_4)_3$(LATP) is a NASICON-type compound which showed the highest lithium conductivity at room temperature. Firstly, LATP was prepared by a sol-gel method. Briefly, 1.46 g lithium nitrate and 1.24 g aluminum nitrate mixture with a fixed molar ratio was dissolved in distilled water and then stirred for 1 h at room temperature. To this dispersion, 5.3 g titanium isopropoxide was slowly added. After that, an aqueous solution containing 3.79 g pre-dissolved di-ammonium hydrogen orthophosphate was added under vigorous stirring. A well-mixed solution was obtained after continuous 6-hour stirring. The final mixture was allowed to stand statically at room temperature for another 48 h before it was heated to 100° C. and held for 3 h to evaporate aqueous solvent. The solid was then calcined at 900° C. for 2 h at a slow heating rate of 5° C. $min^{-1}$ and ground to a fine powder after cooling to room temperature. The resulting dried gel was then calcined at 900° C. for 2 h at a heating rate of 1° C. $min^{-1}$ and ground to a fine powder with particle sizes of 0.1-2 μm after cooling at a cooling rate of 5° C. $min^{-1}$. The powder was ground using ball milling. The crystal phase and morphology of LATP are shown by SEM images and XRD pattern in FIG. 1. FIG. 1 (a,b) shows that the particle size is about 100 μm, while after ball milling the particle size was greatly reduced to 10 μm. In FIG. 1 (d), no impure phases were identified, indicating that the powder is pure LATP phase.

Figure 2:
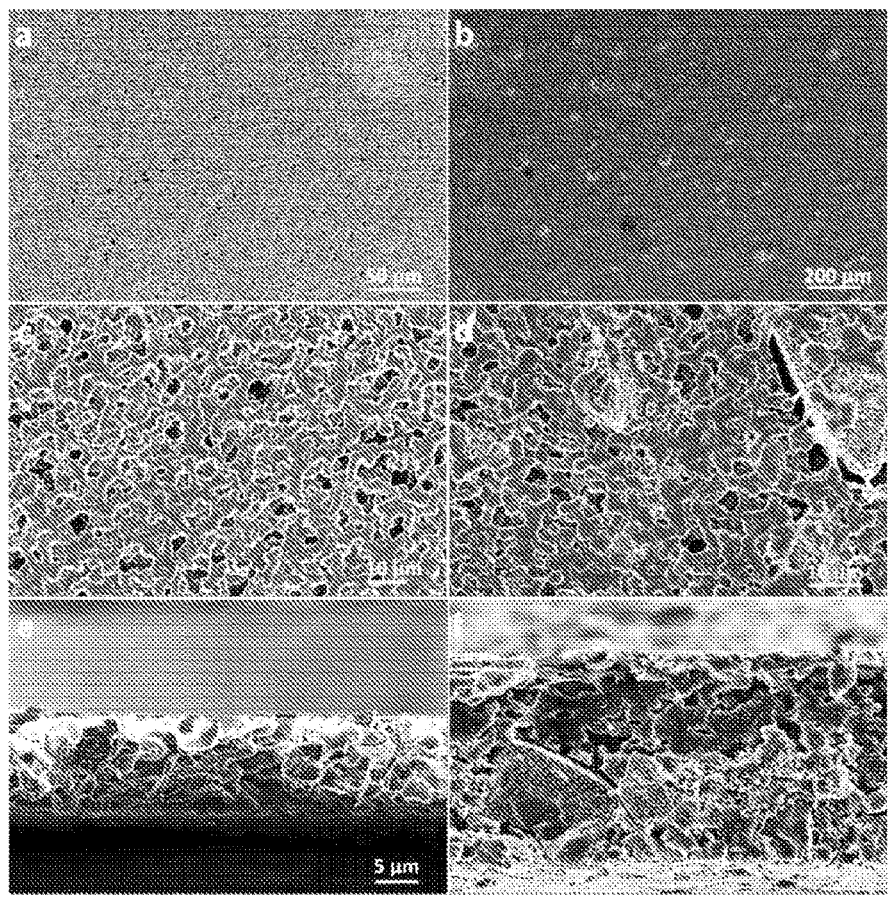
FIG. 2 shows (a) SEM images of a membrane of pure PVDF (a,c,e) and LATP-P (b, d, f)
Figure 3:
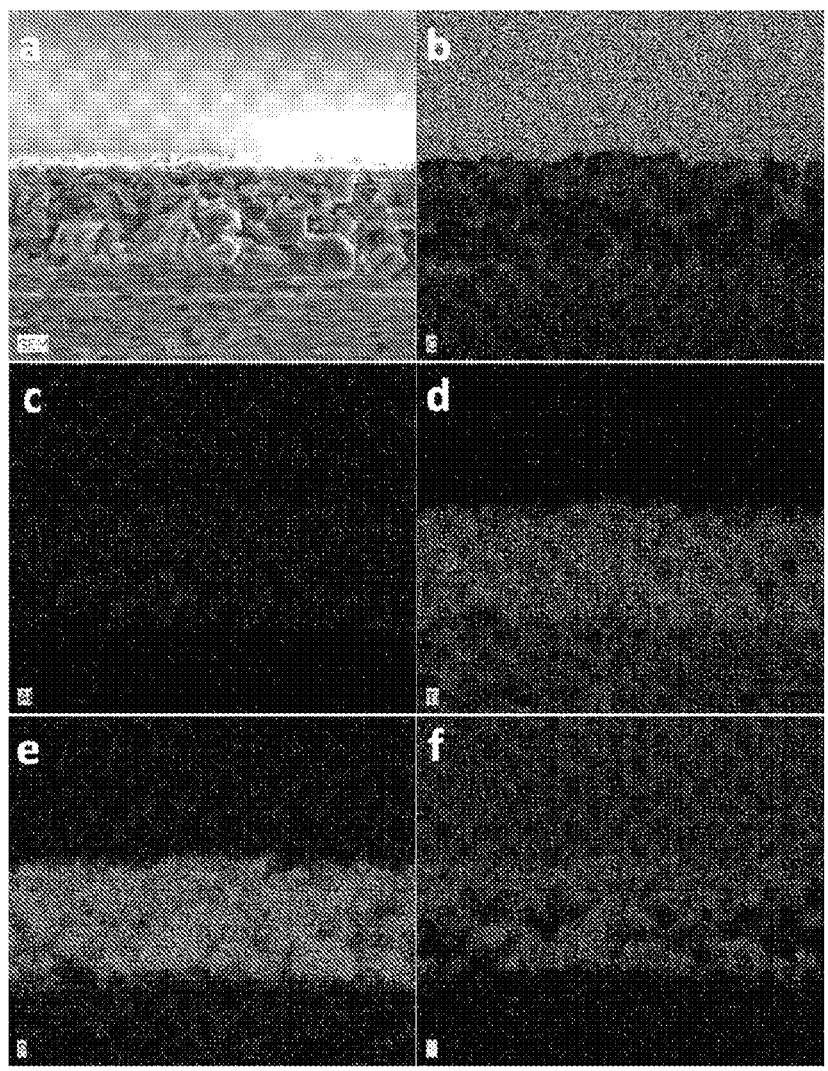
FIG. 3 shows SEM images (a), and energy dispersive X-ray (EDX) elemental mapping of C (b), Al (c), Ti (d), P (e) and O (f) of a LATP-P membrane.
Figure 4:
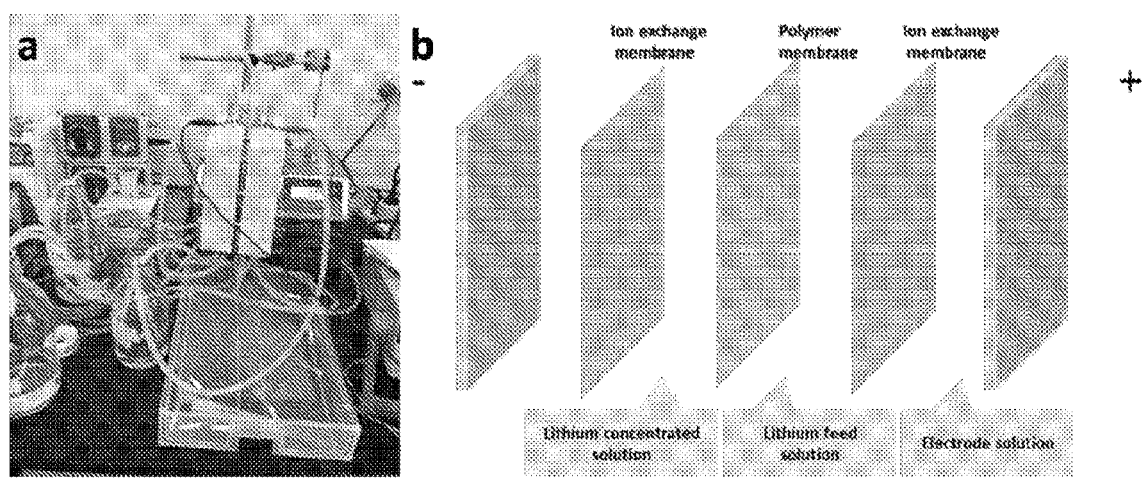
FIG. 4 shows a photo of an electrodialysis system (a) and the schematics of an electrodialysis stack (b).

LATP (5%, wt %) and PVDF (5%, wt %, Mw=180 k) were then dissolved in DMF and stirred for 24 h. A 5 ml of suspension was then poured in to a 9 cm petri dish and dried for 4 hours at 60° C. Longer evaporation time can be used for larger membranes. This sample is referred to as LATP-P. In comparison to the pure PVDF membrane (see FIG. 2 (a, c, e)) the LATP is successfully wrapped by PVDF (see Figure (2b, d, f). This morphology can be further confirmed by EDX mapping analysis (see FIG. 3). The results show that all of the LATP particles are well wrapped and dispersed between layers of PVDF.

In order to optimize the ratio of LATP and polymer (PVDF), LATP-P membranes with different ratios of LATP and PVDF (LATP-P-1 (2:1) and LATP-P-2 (10:1)) were prepared. Furthermore, a high molecule weight PVDF (Mw=534 k) was used to prepare a further membrane, referred therein as LATP-PH (5:1).

Figure 8:
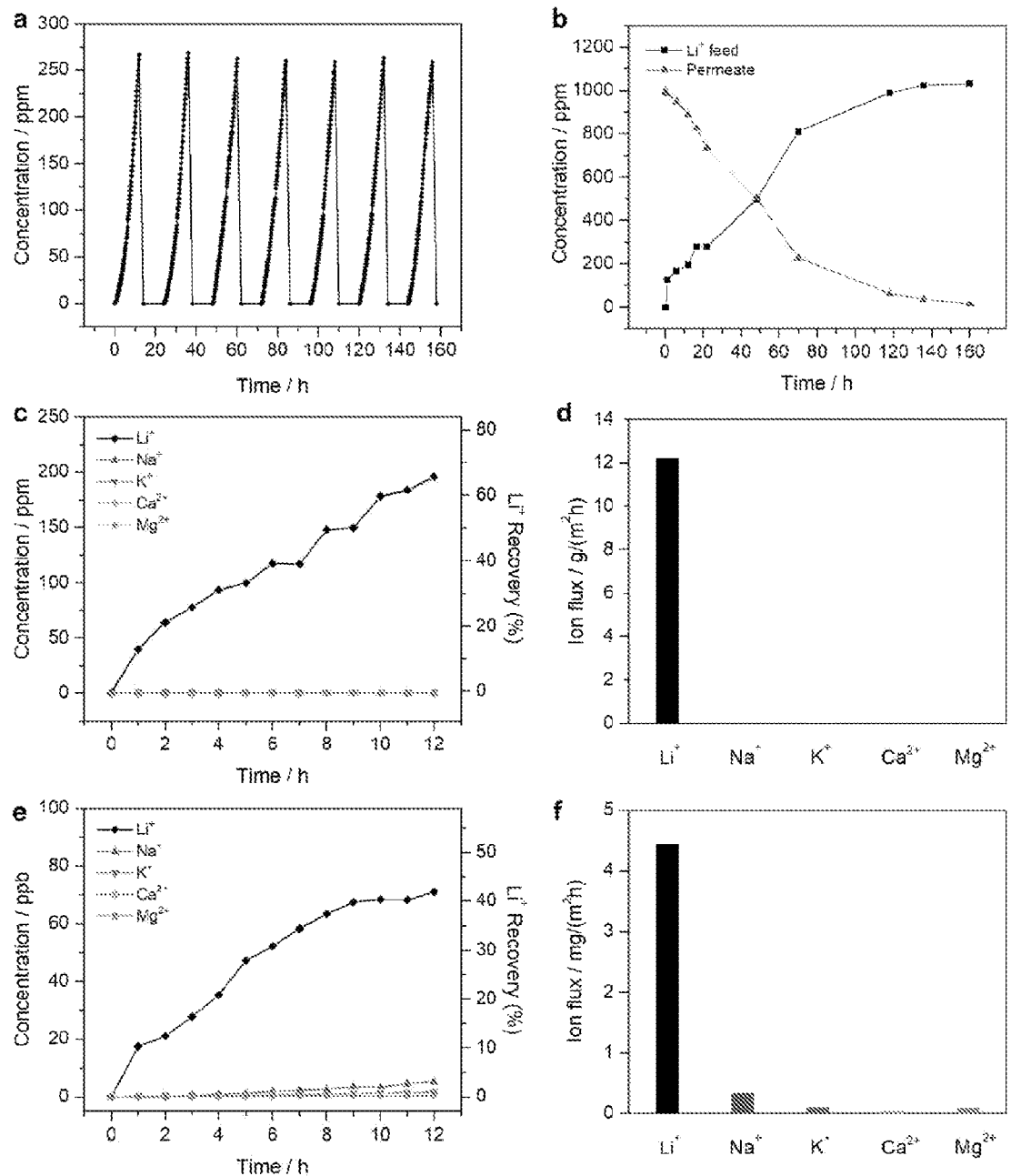
FIG. 8 shows stability and real-world performance of LATP-PVDF membrane. a, Concentration of LiCl at the permeate side using fresh 0.1 M LiCl solution as the feed solution for 7 electrodialysis and washing cycles. b, Concentration of LiCl in the feed and permeate solution after 160 h of continuous electrodialysis test using 0.02 M LiCl feed solution. c, Concentration of $Li^+$ and other ions at the permeate side using synthetic brine water as the feed solution. d, Corresponding ion flux of all available ions in the feed solution at the end of the ED test in c. e, Concentration of $Li^+$ and other ions at the permeate side using synthetic seawater as the feed solution. f, Corresponding ion flux of all available ions in the feed solution at the end of the ED test in e.

Electrodialysis stack set up—FIG. 8(a,b) shows a schematic picture of a system comprising an electrodialysis stack. Three solutions, namely a lithium concentrated solution, a lithium feed solution and an electrode solution are successively loaded into a column between the membranes. Certain amounts of LiCl, NaCl and $MgCl_2$ are used as the lithium feed solution. 300 ppm NaCl solution is used as the electrode solution. The lithium will concentrate at the lithium concentrated solution gradually over time.

The system was run at 2-5 V. The extraction ratio of lithium of up to 70% was achieved. The sample shows lithium to magnesium selectivity of up to 46 and lithium to sodium selectivity of up to 10, respectively (see Table 1). Other polymers such Nafion (LATP-N), chitosan (LATP-C), and polysulfone (LATP-PS) were also investigated. PVDF was found to be the preferred candidate for membrane preparation in these tests.

TABLE 1

Lithium extraction performance of LATP/polymer

|  | Potential (V) | $Li^+$ flux $g/(m^2 \cdot h)$ | $Mg^{2+}$ flux $g/(m^2 \cdot h)$ | $Li^+/Mg^{2+}$ Selectivity | $Na^+$ flux $g/(m^2 \cdot h)$ | $Li^+/Na^+$ Selectivity |
|---|---|---|---|---|---|---|
| LATP-P | 2 | 11.76 | 0.324 | 36.29 | 1.25 | 9.048 |
| LATP-N | 5 | 6.05 | 0.14 | 43.21 | 0.20 | 9.648 |
| LATP-C | 5 | 1.22 | 0.49 | 2.189 | 0.31 | 3.93 |
| LATP-PS | 5 | 0.29 | 0.03 | 9.66 | 0.07 | 4.14 |

The lithium extraction performance of other LATP-P(x) membranes are compared in Table 2. It is clear that the flux of Li+ can be improved by increasing the ratio of LATP in LATP-P membrane. LATP-P-2 showed the highest Li flux of 23.06 g/($m^2 \cdot h$). The selectivity of $Li^+/Mg^{2+}$ and $Li^+/Na^+$ was 46.12 and 9.468, respectively.

TABLE 2

Lithium extraction performance of LATP/polymer

|  | Potential (V) | $Li^+$ flux $g/(m^2 \cdot h)$ | $Mg^{2+}$ flux $g/(m^2 \cdot h)$ | $Li^+/Mg^{2+}$ Selectivity | $Na^+$ flux $g/(m^2 \cdot h)$ | $Li^+/Na^+$ Selectivity |
|---|---|---|---|---|---|---|
| LATP-P | 5 | 13.12 | 4.31 | 3.04 | 9.6 | 1.45 |
| LATP-P-1 | 5 | 2.05 | 1.68 | 1.22 | 0.48 | 4.27 |
| LATP-P-2 | 5 | 23.06 | 0.564 | 46.12 | 2.39 | 9.648 |
| LATP-PH | 5 | 0.25 | 0.637 | 1.915 | 1.669 | 0.731 |

In order to confirm the selectivity, the inventors also used a mixture of LiCl/NaCl/$MgCl_2$ (300 ppm) as the feed solution to test LATP-P-2. All of the $Na^+$ and $Mg^{2+}$ was rejected except for the $Li^+$ in the feed solution. The flux of $Li^+$ was found to be 0.5 g/($m^2 \cdot h$). Although the flux of Li+ was relatively low, only $Li^+$ was found to permeate through the LATP-P membrane. This indicated that the LATP-P shows higher performance for lithium recovery from mixture solution.

Scale up the system—The inventors assembled a bigger electrodialysis system for Li$^+$ extraction. In this experiment, 1000 ppm LiCl/MgCl/NaCl was used as a feed solution. The working potential was 20V. The flux of Li$^+$ was 48.26 g/(m$^2$·h). The recovery rate reached was 98.5%. The selectivity of Li$^+$/Mg$^{2+}$ and Li$^+$/Na$^+$ was 39.6 and 10.3, respectively.

Example 2—In another exemplary embodiment, the inventors have created a solution-processable, lithium-selective membrane from a composite of lithium superionic conductor (Li$_{1.3}$Al$_{0.3}$Ti$_{1.7}$(PO$_4$)$_3$) and polyvinylidene fluoride (PVDF). The membrane, when tested in an electrodialysis (ED) setup using synthetic salt brine as the feed solution, achieved Li$^+$/Na$^+$ and Li$^+$/Mg$^{2+}$ selectivity of 9107 and 2239, respectively. Compared to traditional lithium mining, the present lithium recovery process is highly energy-efficient, consuming 1.84 kWh of electricity per kg of lithium chloride from brine. Most importantly, the membrane can extract lithium ion from a water source with a low lithium ion concentration as low as 170 ppb. Such scalable, selective membranes offer a new avenue for sustainable lithium mining.

LATP particles using a sol-gel method (Kunshina, G et al. *Russian Journal of Inorganic Chemistry* 59, 424-430 (2014). LATP particles with no AlPO$_4$ impurity detected. Powder X-ray diffraction (XRD) was used to analyse the structure of LATPs. XRD patterns were obtained in a 2θ range of 10–60° with a scan rate of 2° min-1 at room temperature by a Miniflex 600 diffractometer (Rigaku, Japan) with Cu-Kα radiation (15 mA and 40 kV). Surface morphology, membrane thickness and composition were studied using field emission scanning electron microscopy (FESEM) utilizing a Nova NanoSEM 450 (FEI, USA) operating at 5 kV. All samples were coated with platinum before SEM examination. X-ray photoelectron spectroscopy (XPS) was characterized by a VG Multilab 2000 photoelectron spectrometer (VG Inc.) with monochromatic Al Kα radiation at 2×10$^{-6}$ Pa. The binding energies were referenced to the C 1s peak at 284.8 eV of surface adventitious carbon in the sample. The ion concentration in the permeate solution was measured using Perkin-Elmer NexION 2000 ICP mass spectrometer for synthetic brine and seawater as feed. The ion concentration in the permeate solution was measured by an external testing organization ALS for equimolar mixed ion feed.

LATP-PVDF membrane is prepared by solvent-evaporation-induced phase separation (SEIPS). A predetermined amount of LATP powder was mixed with polyvinylidene difluoride (PVDF) in Dimethylformamide (DMF). The mixture was stirred at 80° C. for 8 h. Then the mixture was transferred into a flat bottom glass container and underwent SEIPS for 6 h. The LATP-PVDF membrane was collected after 12 h heating at 60° C. The LATP-PVDF membranes were fabricated by casting a LATP-PVDF dope solution onto a glass container, in which the solution underwent solvent evaporation-induced phase separation (SEIPS), resulting in the formation of an off-white membrane (FIG. 6*a*).

Figure 6:
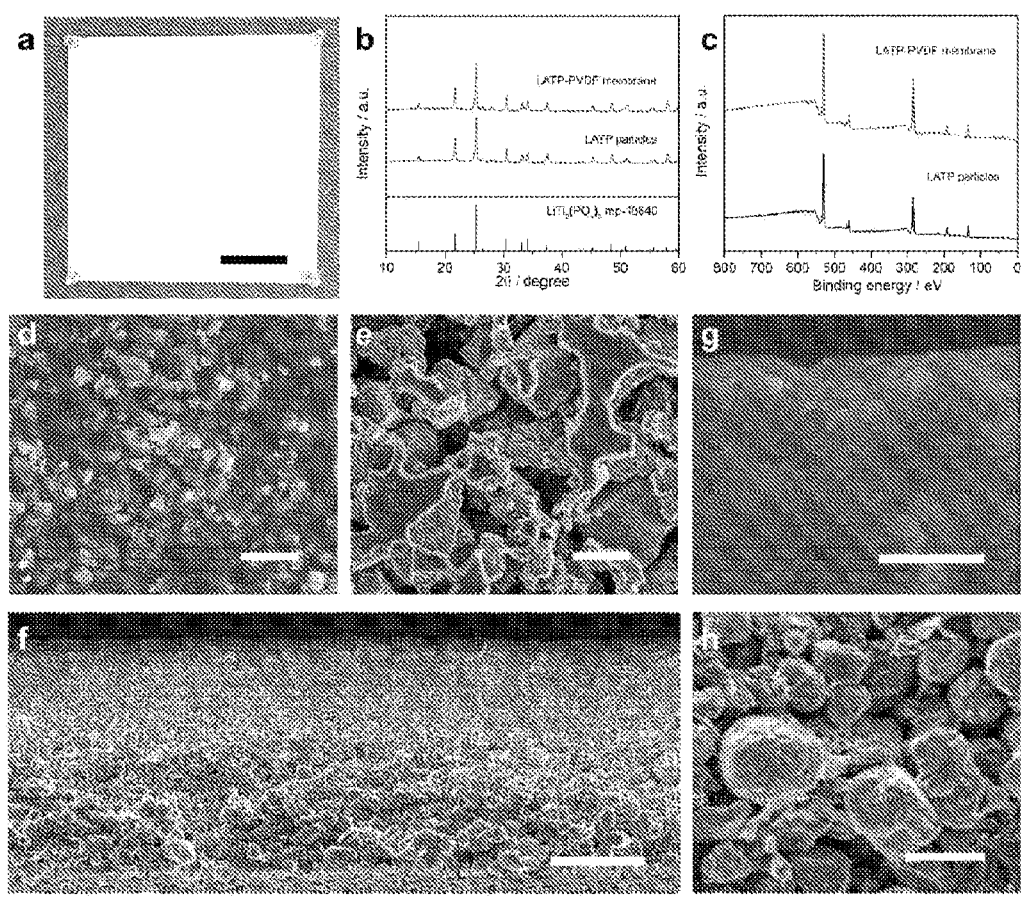
FIG. 6 shows a, Digital photograph of LATP-PVDF composite membrane. Scale bar, 5 cm. b, XRD. c, XPS. d, SEM image of the skin layer. Scale bar, 1 μm. e, SEM image of the bottom layer of the LATP-PVDF membrane. Scale bar, 5 μm. f, SEM image of the cross-section. Scale bar, 50 μm. g, SEM image of the skin layer cross-section. Scale bar, 1 μm. h, SEM image of the bottom layer cross-section. Scale bar, 5 μm.

To highlight the scalability of the LATP-PVDF membrane fabrication, a membrane sheet of size 25 cm×30 cm was prepared (FIG. 6*a*). The LATP-PVDF membrane showed XRD characteristic peaks and XPS spectrum similar to that of the LATP powders (FIGS. 6*b* and 6*c*), suggesting that the pure LATP phase was maintained after processing into the LATP membrane. The SEM imaging of the top (FIG. 6*f* and bottom layer (FIG. 6*f* of the LATP-PVDF membrane revealed a dense skin layer and a porous bottom layer. "Skin layer" refers to the upper layer facing the air while the bottom layer refers to the layer facing the glass container during SEIPS. The vertical cross-sectional SEM imaging of LATP-PVDF membrane revealed a heterogeneous microstructure comprising an asymmetric or ceramic particle size density gradient and asymmetric ceramic particle compaction gradient structure consisting of LATP particles embedded within the matrix of the PVDF polymer (FIG. 6*f* in which a ceramic particle size gradient leading to variable density and compaction of particles is evident. The smaller and compacted LATP particles were observed closer to the skin layer (FIG. 6*g*) while the larger LATP particles were found near the bottom section of the membrane (FIG. 6*h*) and adopted a less compacted and more porous region. The unique microstructure is a desirable outcome of the rapid sedimentation of the larger agglomerates of LATP particles during SEIPS. Conventionally, a membrane solution that undergoes SEIPS often leads to an isotropic and less porous structure. As an example, a pure PVDF membrane was also fabricated whereby an isotropic and porous structure was observed. In the present case, the asymmetric structure necessary for high flux was achieved. During SEIPS, as solvent continued to evaporate beyond the solubility limit of the PVDF while PVDF continued to absorb water vapour from the atmosphere with humidity of 40-60%, the PVDF underwent the phase separation, slowly forming a solid-phase PVDF dense film around the LATP sediments.

Figure 5:
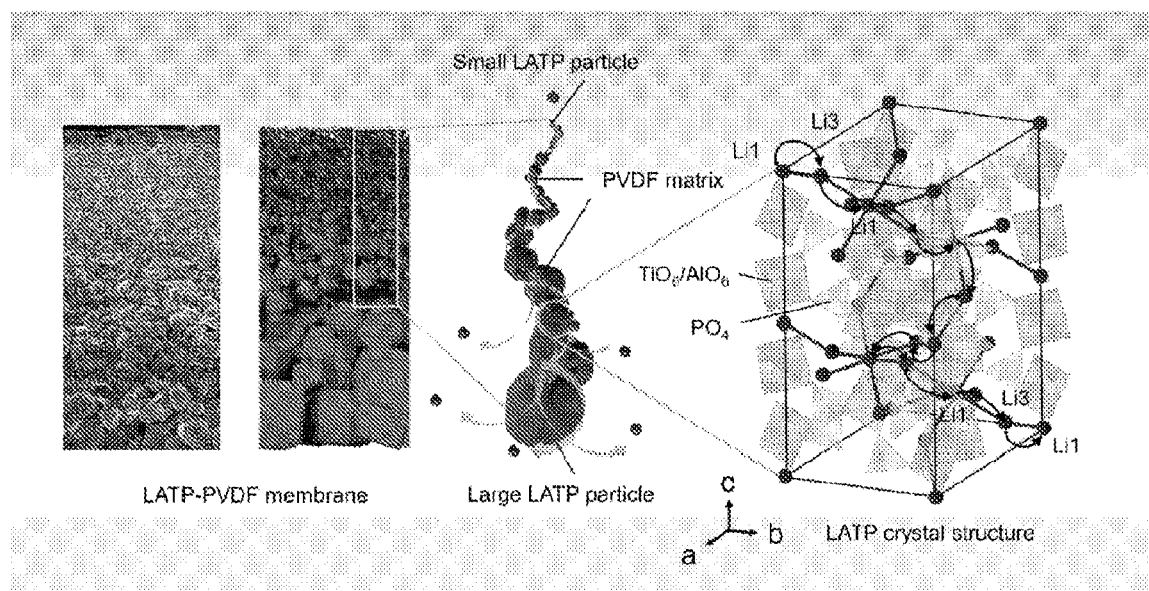
FIG. 5 shows a schematic illustration of the migration of $Li^+$ ion through the LATP structure. Li sites (pink spheres), consisting of Li1 (stable sites) and Li3 (transition sites), the ions may use to diffuse through the crystal lattice. The pink bar, blue octahedra and the green tetrahedra correspond to Li diffusion channels, $TiO_6/AlO_6$ and $PO_4$, respectively.

The interparticle space between LATP particles that was filled with PVDF dope became narrower as PVDF dope gradually changed phase from fluid to glassy region. Completion of the SEIPS led to a LATP-PVDF membrane with a dense top layer and a LATP/PVDF mixed matrix. A schematic of the formation of LATP-PVDF membrane by SEIPS is available in FIG. 5.

The LATP-PVDF membrane in this work was designed for lithium recovery via electrodialysis, with one side of the membrane (for example, but not limited to the upper/skin layer) facing the feed solution and the other side (for example, but not limited to the bottom layer) facing the permeate solution (product solution). The conductivity of the permeate site ranges between 0.055 μS/cm-202.2 mS/cm, that is between the conductivity of deionized water and concentrated LiCl solution. The actual conductivity of the permeate solution will depend on the ED process parameter (e.g. current density, temperature, pH, etc.) and feed composition (e.g., brine, seawater, Li recycling feed source, etc.). SEIPS was selected to fabricate an asymmetric structured LATP-PVDF membrane as the resultant membrane achieved high Li$^+$ conductivity of at least 104 S/cm and above (approaching that of the liquid electrolyte) to enable high Li$^+$ flux regardless of the concentration of the permeate solution. Additionally, the unique LATP-PVDF structure achieved via SEIPS is also expected to reduce the electrical resistance across the membrane when a current is applied to the electrodes at the two ends of an electrodialysis (ED) cell.

The dense PVDF component of the LATP-PVDF membrane, providing a barrier to the water molecules in the aqueous solution, ensures there is no salt leakage across the membrane which may compromise the overall selectivity (and efficiency) of ED process. Without being bound by any theory, it is believed that the ion selectivity arises from the tightly packed LATP particles at the skin layer, where Li$^+$ ions migrate through the LATP channels formed by closely packed LATP particles across the membrane matrix to the bottom side of the membrane. Closer to the bottom region of the LATP-PVDF membrane, the wider interparticle space (FIG. 6*h*) between the LATP particles is partially filled by the PVDF polymer chains, leaving behind a more porous structure. When the LATP-PVDF membrane is used in the ED process, the porous structure will be filled by the permeate solution which will also facilitate the ion transport. The extend of the contribution of permeate solution and LATP channels to the conductivity will depend on the conductivity of the permeate solution and the conductivity of LATP in the solution. Since the process is made partially through sedimentation of LATP and SEIPS of PVDF, the network of LATP is always maintained from the skin layer to the bottom layer, forming ion channels that enable transport exclusive to $Li^+$.

Example 3—Lithium separation performance of LATP-PVDF membrane—An ED system was used to test the lithium-ion separation performance of the membranes. The ED process used in this study is made up of a stack of 3 membranes consisting of AEM, LATP-PVDF membrane and AEM in the same order (AEM: anion exchange membrane). ED, in which the movement of ions is regulated through an applied electric potential difference, has found applications in brackish water desalination, water treatment and ion recovery. In the present ED experiments, LATP-PVDF membrane was used in place of the commercial cation exchange membrane.

The ion separation performance of LATP-PVDF membrane was surveyed with various feed solutions consisting of LiCl, NaCl, $MgCl_2$ or all three salts.

TABLE 3

| Composition (ppm) | Composition of feed solution | | | | | |
|---|---|---|---|---|---|---|
| | $Mg^{2+}$ | $Ca^{2+}$ | $Na^+$ | $K^+$ | $Li^+$ | $Cl^-$ |
| LiCl (0.1M) | — | — | — | — | 2430.5 | 4239.4 |
| LiCl (0.01M) | — | — | — | — | 243.1 | 423.9 |
| LiCl (0.0001M) | — | — | — | — | 2.431 | 4.239 |
| Equimolar mixture of $Li^+/Na^+/Mg^{2+}$ (0.3M) | 2430.5 | — | 2299.0 | — | 2430.5 | 14180 |
| Seawater | 1350 | 400 | 10500 | 380 | 0.17 | 12765 |
| Brine | 631 | 866 | 23100 | 500 | 300 | 25397 |

Figure 7:
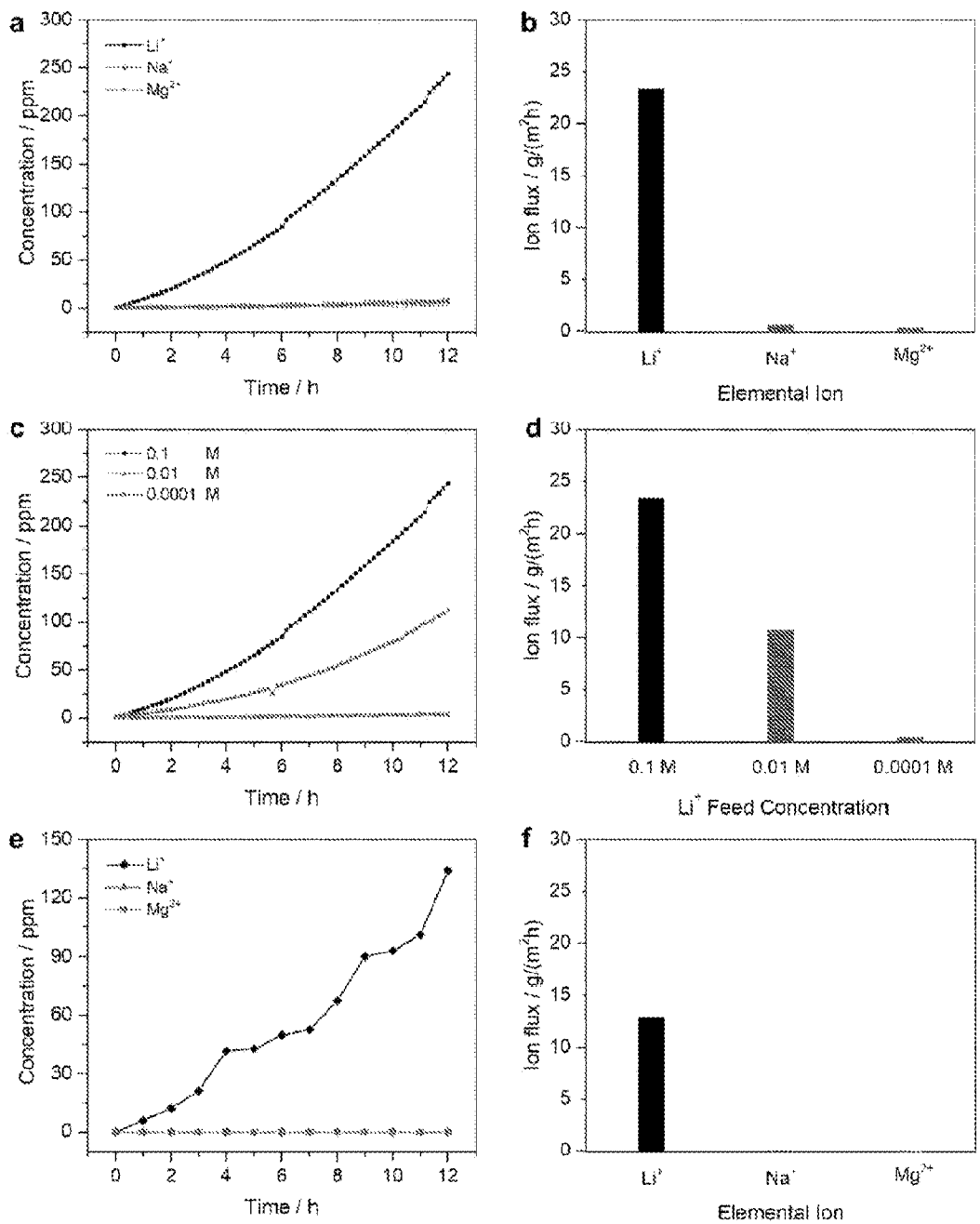
FIG. 7 shows lithium separation performance. a, Concentration of LiCl, NaCl and $MgCl_2$ ions at the permeate side. b, corresponding ion flux of the membrane as a function of electrodialysis time. Feed: 0.1 M single ion solution of LiCl, NaCl and $MgCl_2$, respectively. c, Concentration of LiCl ion in the permeate side. d, corresponding $Li^+$ ion flux of the membrane as a function of electrodialysis time. Feed: 0.1 M, 0.01 M and 0.0001 M single ion solution of LiCl, respectively. e, Concentration of $Li^+$, $Na^+$ and $Mg^{2+}$ ions at the permeate side based on ICP measurement. f, corresponding ion flux of the membrane. Feed: 0.3 M mixed ion solution; $LiCl:NaCl:MgCl_2$=1:1:1, molar ratio). All experiments were conducted at room temperature.

In the single ion permeation test using 0.1 M of LiCl, NaCl and $MgCl_2$, respectively as the feed solution, the concentration of $Li^+$ ion in the permeate side increases with the ED time while negligible $Na^+$ and $Mg^{2+}$ ions permeate across the membrane (FIG. 7a). The membrane shows the $Li^+$ flux of 23.35 g/($m^2 \cdot h$) with minimal $Na^+$ and $Mg^{2+}$ fluxes of 0.62 and 0.35 g/($m^2 \cdot h$), respectively at the end of the ED experiment (FIG. 7b). This gives the LATP membrane the $Li^+/Na^+$ and $Li^+/Mg^{2+}$ ideal selectivities of 37.7 and 65.7, respectively after 12 h.

To determine the practicality of LATP-PVDF membrane for $Li^+$ recovery from different feed sources, the ED experiments were conducted using different concentration of LiCl solution as feed (FIG. 7c). As shown in FIG. 7c, the concentration of $Li^+$ in the permeate side increases with both the $Li^+$ concentration of the feed solution and the operation time as expected as from the higher number of $Li^+$ ions in contact with the membrane surface at any one time as higher $Li^+$ concentration feed solution was used. Although the $Li^+$ ion flux of merely 0.37 g/($m^2 h$) (FIG. 7d) was measured for the feed solution of 0.0001 M $Li^+$ (~4.2 ppm), the corresponding $Li^+$ recovery from the feed solution of 300 ml after 12 h was 90.4%, demonstrating the applicability of LATP-PVDF membranes for low $Li^+$ concentration source. Nevertheless, a non-linear increase with $Li^+$ recovery with feed concentration observed suggests an upper limit to the highest ion flux achievable by LATP-PVDF membranes by concentrating the feed solution, which is a common step to increase the $Li^+$ recovery efficiency in the lithium mining industry. The wide application of LATP-PVDF membrane to different feed concentration has a huge advantage for lithium separation in real-world condition as the $Li^+$ concentration from different sources can vary significantly (e.g., average $Li^+$ concentration in seawater and brine are 170 ppb and 300 ppm, respectively). Furthermore, the role of LATP channels in LATP-PVDF membrane in $Li^+$ ion permeation and selectivity was verified in the ED test using a pure PVDF membrane in place of the LATP-PVDF membrane. When the PVDF membrane was used, the concentration of the feed and permeate remained the same through the entire ED experiment, indicating that the PVDF component of the membrane was not permeable to any ions. The volume of the feed and permeate solution also remained the same through all ED experiments.

The real-world application of lithium-selective membrane would require the separation of salt mixtures. In our study, a salt solution made up of 0.1 M LiCl, 0.1 M NaCl and 0.1 M $MgCl_2$ was used for the ED tests. As shown in FIG. 7e, the $Na^+$ and $Mg^{2+}$ concentrations in the permeate side were consistently below the detection limit of the ICP-OES spectrometer (samples were sent to $3^d$ party testing and certification company, ALS), confirming that the LATP-PVDF membrane is only permeable to $Li^+$ ion. The resulting $Li^+$ flux is almost halved compared to the single ion experiment (FIG. 7f) likely due to the competitive ion sorption on the surface of the membrane. The actual ion selectivities of the LATP-PVDF are significantly higher than the ideal selectivities as the permeate solution only contains $Li^+$ (i.e., $Li^+/Na^+$ and $Li^+/Mg^{2+}=\infty$). For easier comparison with the performance of lithium separation membranes reported to date, assuming the concentration of $Na^+$ and $Mg^{2+}$ in the permeate solution are ~1 ppm, the corresponding minimum and underestimated $Li^+/Na^+$ and $Li^+/Mg^{2+}$ selectivities are 134. The test results showed that the LATP-PVDF membrane in this study has significantly greater $Li^+$ flux and selectivity than all current $Li^+$ separation membranes.

Membrane stability—The membrane was subjected to 7 cycles consisting of 12 h of ED using 0.1 M LiCl solution as feed and 12 h of membrane cleaning by circulating DI water to determine the robustness of the LATP-PVDF membrane and the stability of the LATP channels. FIG. 8a shows that the LATP-PVDF membrane performance remained stable after completing the 7 cycles. In each cycle, the membrane showed the same ion flux consistently between 24.8 and 25.7 g/($m^2 \cdot h$) at the end of each cycle. Additionally, the stability of LATP-PVDF membrane was demonstrated by performing the electrodialysis at a LiCl concentration of 0.02 M until $Li^+$ is mostly recovered. The feed concentration of ~0.02 M (or 1000 ppm) was selected such that $Li^+$ can permeate through the membrane within similar experiment time as that of the 7-cycle stability test (FIG. 8b).

The XRD pattern and the morphologies of the LATP-PVDF membranes before and after the stability test did not show any notable difference. Based on the membrane performance, crystallinity and morphology of the membrane, it is believed that the membrane is mechanically robust and stable. Real-world performance and energy consumption—The real-world performance of the LATP-PVDF membrane was demonstrated using synthetic brine solution and seawater (see Table 3). Using brine as the feed solution, consisting of 300 ppm $Li^+$ (or ~0.007 M of $Li^+$), similar ion selectivity behaviour was observed for LATP-PVDF membrane, where all ions other than $Li^+$ are almost completely rejected by the membrane. Using a brine feed solution of 300 ml, a $Li^+$ recovery of 65.3% can be achieved within 12 h. The corresponding $Li^+$ ion flux was 12.23 g/(m²h), which is similar to that of the single ion experiment conducted for 0.01 M of $Li^+$. Based on the concentration in the permeate solution (detected using ICP-MS with a detection limit of ppt level, see Methods), the $Li^+/Na^+$ selectivity of 9107 was achieved. The result indicated that the lithium ion recovery from brine solution could be fully realised.

When synthetic seawater is used as the feed ($Li^+$ concentration: 170 ppb), it was possible to recover 41.8% of $Li^+$ from the synthetic seawater in 12 h. The $Li^+$ flux was much lower due to the very low concentration of $Li^+$ in the synthetic seawater. Nevertheless, the actual ion selectivity of $Li^+/Na^+$, $Li^+/K^+$, $Li^+/Mg^{2+}$ and $Li^+/Ca^{2+}$ are 13.0, 43.7, 46.6 and 123.6, respectively, suggesting lithium recovery from seawater can still be achieved efficiently. However, the selectivity is significantly lower compared to brine as the feed. Considering the ratio of $Li^+$ to $Na^+$ in the seawater feed solution is as high as 1:61765, the $Li^+/Na^+$ selectivity of 13.0 is highly significant. Note that no membrane in the market can achieve such $Li^+/Na^+$ selectivity even for an equimolar mixture of $Li^+$ and $Na^+$.

The $Li^+/Na^+$ and $Li^+/K^+$ ion selectivity shown by the LATP-PVDF membrane when synthetic seawater and brine were used as the feed solutions strongly suggests that the ion separation is achieved through partial dehydration of the monovalent ions. This is especially true for a feed solution whereby $Na^+$ dominates the seawater solution. In the case of lithium recovery from brine, where $Li^+:Na^+$ is 1:77, the $Li^+/Na^+$ selectivity of 9107 indicated that the skin or upper layer of the membrane was sufficiently dense to prevent water leakage which may allow undesirable ions across the membrane to the permeate end.

Using the membrane performance data obtained from the laboratory experiments and the typical energy consumption of commercial electrodialysis system, which consist of a stack of large-area membranes of 400 mm×1600 mm and a total membrane area of 665.6 m², it was estimated that the real-world energy consumption in commercial scale to be ~1.84 kWh for every kg the lithium recovery.

The invention claimed is:

1. A membrane for target ion separation, the membrane comprising:
    a target ion permeable polymer-ceramic composite material comprising:
    a target ion permeable ceramic and at least one target ion permeable organic polymer associated with the target ion permeable ceramic,
    wherein the membrane allows selective permeation of the target ion through the membrane;
    wherein the target ion permeable polymer-ceramic composite has a microstructure comprising ceramic particle dense upper layers or regions having reduced porosity characterized by narrower interparticle spaces, and less ceramic particle dense bottom layers or regions having increased porosity characterized by wider interparticle spaces; and
    wherein the membrane is produced using a solvent evaporation-induced phase separation (SEIPS) process.

2. The membrane of claim 1, wherein the target ion separation membrane is for target ion separation from an aqueous solution.

3. The membrane of claim 1, wherein the membrane is selectively permeable to the target ion under the influence of an electrical potential.

4. The membrane of claim 1, wherein the target ion permeable ceramic and the at least one organic polymer are present in the composite at a concentration (wt %) ratio of from 1:1 to 15:1.

5. The membrane of claim 1, wherein the membrane comprises a heterogenous dispersion of ceramic particles in a matrix formed by the polymer.

6. The membrane of claim 1, wherein the target ion permeable polymer-ceramic composite comprises at least two layers wherein a first layer comprises a target ion permeable ceramic rich layer comprising particles of target ion permeable ceramic, and a second layer which is an organic polymer rich layer, wherein the first layer comprises more target ion permeable ceramic particles than the organic polymer rich layer.

7. The membrane of claim 1, wherein the at least one organic polymer fill gaps between grain boundaries in the ceramic particles.

8. The membrane of claim 1, wherein the target ion permeable ceramic in the target ion permeable ceramic material is compacted and the level of compaction, the ceramic particle density, or the ceramic particle size is variable across a vertical cross section of the membrane, or the level of compaction, the ceramic particle density and the ceramic particle size is variable across a vertical cross section of the membrane.

9. The membrane of claim 1, wherein the target ion permeable polymer-ceramic composite comprises at least two regions, wherein a first region comprises a target ion permeable ceramic rich region comprises densely packed particles of target ion permeable ceramic, and a second region comprising less densely packed particles of target ion permeable ceramic than the first region.

10. The membrane of claim 1, wherein the at least one organic polymer is a hydrophilic organic polymer selected from the group consisting of: polyvinylidene fluoride (PVDF), sulfonated tetrafluoroethylene copolymer (Nafion), chitosan, and polysulfone, and combinations thereof.

11. The membrane of claim 1, wherein the target ion permeable ceramic is a lithium super ionic conductor.

12. The membrane of claim 1, wherein the target ion permeable polymer-ceramic composite is supported on target ion porous support substrate.

13. The membrane of claim 1, wherein the at least one organic polymer penetrates into at least a portion of target ion channels in the target ion permeable ceramic.

14. A membrane for lithium target ion separation from an aqueous solution of ions, the membrane comprising:
    a lithium target ion porous support substrate supporting a lithium target ion permeable polymer-ceramic composite material;
    wherein the target ion permeable polymer-ceramic composite material is $Li_{1.3}Al_{0.3}Ti_{1.7}(PO_4)_3$ (LATP) ceramic associated with polyvinylidene fluoride (PVDF), wherein the PVDF is present in the target ion permeable polymer-ceramic composite at a concentration (wt %) ratio of about 10:1 (ceramic:polymer);

wherein the target ion permeable polymer-ceramic composite has a microstructure comprising ceramic particle dense upper layers or regions having reduced porosity characterized by narrower interparticle spaces, and less ceramic particle dense bottom layers or regions having increased porosity characterized by wider interparticle spaces; and wherein the membrane is produced using a solvent evaporation-induced phase separation (SEIPS) process.

15. A process for manufacturing an electrodialysis membrane comprising the steps of:

Preparing a solution of a target ion permeable ceramic material, and at least one organic polymer, in a volatile organic solvent;

Solution casting the solution onto a mould of predetermined shape; and

Evaporating the solvent to form a membrane of a target ion permeable polymer-ceramic composite material;

Wherein the step of evaporating the solvent involves evaporation via a solvent evaporation-induced phase separation (SEIPS) process;

Wherein the target ion permeable polymer-ceramic composite has a microstructure comprising ceramic particle dense upper layers or regions having reduced porosity characterized by narrower interparticle spaces, and less ceramic particle dense bottom layers or regions having increased porosity characterized by wider interparticle spaces.

16. An electrodialysis method of selective lithium ion separation from brine or lithium ion separation from lithium containing solution from a lithium recycling method, comprising the step of applying a voltage to a membrane comprising:

a target ion permeable polymer-ceramic composite material comprising:

a target ion permeable ceramic and at least one target ion permeable organic polymer associated with the target ion permeable ceramic, wherein the membrane allows selective permeation of the target ion through the membrane or to a membrane comprising:

a lithium target ion porous support substrate supporting a lithium target ion permeable polymer-ceramic composite material;

wherein the target ion permeable polymer-ceramic composite material is $Li_{1.3}Al_{0.3}Ti_{1.7}(PO_4)_3$ (LATP) ceramic associated with polyvinylidene fluoride (PVDF), wherein the PVDF is present in the target ion permeable polymer-ceramic composite at a concentration (wt %) ratio of about 10:1 (ceramic:polymer);

wherein the target ion permeable polymer-ceramic composite has a microstructure comprising ceramic particle dense upper layers or regions having reduced porosity characterized by narrower interparticle spaces, and less ceramic particle dense bottom layers or regions having increased porosity characterized by wider interparticle spaces; and wherein the membrane is produced using a solvent evaporation-induced phase separation (SEIPS) process.

17. An electrodialysis stack comprising a membrane comprising:

a target ion permeable polymer-ceramic composite material comprising:

a target ion permeable ceramic and at least one target ion permeable organic polymer associated with the target ion permeable ceramic, wherein the membrane allows selective permeation of the target ion through the membrane or to a membrane comprising:

a lithium target ion porous support substrate supporting a lithium target ion permeable polymer-ceramic composite material;

wherein the target ion permeable polymer-ceramic composite material is $Li_{1.3}Al_{0.3}Ti_{1.7}(PO_4)_3$ (LATP) ceramic associated with polyvinylidene fluoride (PVDF), wherein the PVDF is present in the target ion permeable polymer-ceramic composite at a concentration (wt %) ratio of about 10:1 (ceramic:polymer), wherein the target ion permeable polymer-ceramic composite has a microstructure comprising ceramic particle dense upper layers or regions having reduced porosity characterized by narrower interparticle spaces, and less ceramic particle dense bottom layers or regions having increased porosity characterized by wider interparticle spaces; and wherein the membrane is produced using a solvent evaporation-induced phase separation (SEIPS) process;

disposed between a pair of anion exchange membranes.

18. The electrodialysis stack of claim 17, comprising a plurality of membranes, each membrane disposed between a pair of anion exchange membranes.

* * * * *